(12) United States Patent
Rice

(10) Patent No.: US 6,386,756 B1
(45) Date of Patent: May 14, 2002

(54) CUP FOR INDICATING TEMPERATURE OF CONTENTS THEREOF AND METHOD OF MAKING

(76) Inventor: Sean Rice, 28-42 202 St., Bayside, NY (US) 11360

( * ) Notice: Subject to any disclaimer, the term of this patent is extended or adjusted under 35 U.S.C. 154(b) by 0 days.

(21) Appl. No.: 09/498,973

(22) Filed: Feb. 7, 2000

(51) Int. Cl.⁷ ............................................. G01K 11/12
(52) U.S. Cl. ...................... 374/157; 374/162; 229/400; 493/906
(58) Field of Search ................................ 374/157, 150, 374/162; 215/11.2; 229/400, 403, 162; 116/216; 493/37, 905, 906

(56) References Cited

U.S. PATENT DOCUMENTS

| | | | | |
|---|---|---|---|---|
| 3,651,695 A | * | 3/1972 | Brown | 374/147 |
| 3,826,221 A | | 7/1974 | Ross | 116/114 V |
| 4,156,365 A | * | 5/1979 | Heinmets et al. | 374/162 |
| 4,268,567 A | * | 5/1981 | Harmony | 428/195 |
| 4,518,639 A | * | 5/1985 | Phillips | 588/13 |
| 4,773,767 A | * | 9/1988 | Coll | 374/147 |
| 4,919,983 A | | 4/1990 | Fremin | 428/35.7 |
| 5,007,578 A | * | 4/1991 | Simone | 229/400 |
| 5,086,642 A | * | 2/1992 | Jessel et al. | 73/1.03 |
| 5,145,107 A | * | 9/1992 | Silver et al. | 229/1.5 |
| D343,129 S | | 1/1994 | Farley | D10/46.2 |
| 5,282,683 A | * | 2/1994 | Brett | 374/150 |
| 5,385,260 A | | 1/1995 | Gatcomb | 229/400 |
| 5,482,373 A | * | 1/1996 | Hutchinson | 374/141 |
| 5,588,747 A | * | 12/1996 | Blevins | 374/157 |
| 5,720,555 A | | 2/1998 | Elele | 374/150 |
| 5,738,442 A | * | 4/1998 | Paron et al. | 374/162 |
| 5,746,372 A | * | 5/1998 | Spence | 229/403 |
| 6,109,518 A | * | 8/2000 | Mueller et al. | 229/403 |
| 6,257,485 B1 | * | 7/2001 | Sadlier et al. | 229/403 |
| 6,277,454 B1 | * | 8/2001 | Neale et al. | 428/34.2 |

FOREIGN PATENT DOCUMENTS

JP    09225009 A  *  9/1997

* cited by examiner

Primary Examiner—Diego Gutierrez
Assistant Examiner—Lydia M. DeJesús
(74) Attorney, Agent, or Firm—Richard L. Miller

(57) ABSTRACT

A cup for indicating temperature of contents thereof and a method of making. The cup includes a body that is cup-shaped and a temperature sensitive strip that is disposed on the body and indicates the temperature of the contents thereof. The body includes an outer cup and an inner cup that is disposed in, and is in intimate contact with, the outer cup. The temperature sensitive strip has a shape and is removably adhered on the longitudinal wall of the inner cup, just above the base thereof. The outer cup has a bore that has a shape, a pair of vertical edges, and extends through the longitudinal wall thereof, just above the base thereof. The shape of the bore matches the shape of the temperature sensitive strip so as to allow the temperature sensitive strip to be viewed through the bore. The longitudinal wall of the outer cup further has a temperature scale thereon that is disposed adjacent both vertical edges of the bore and collaborates with the temperature sensitive strip to indicate the temperature of the contents of the cup.

15 Claims, 3 Drawing Sheets

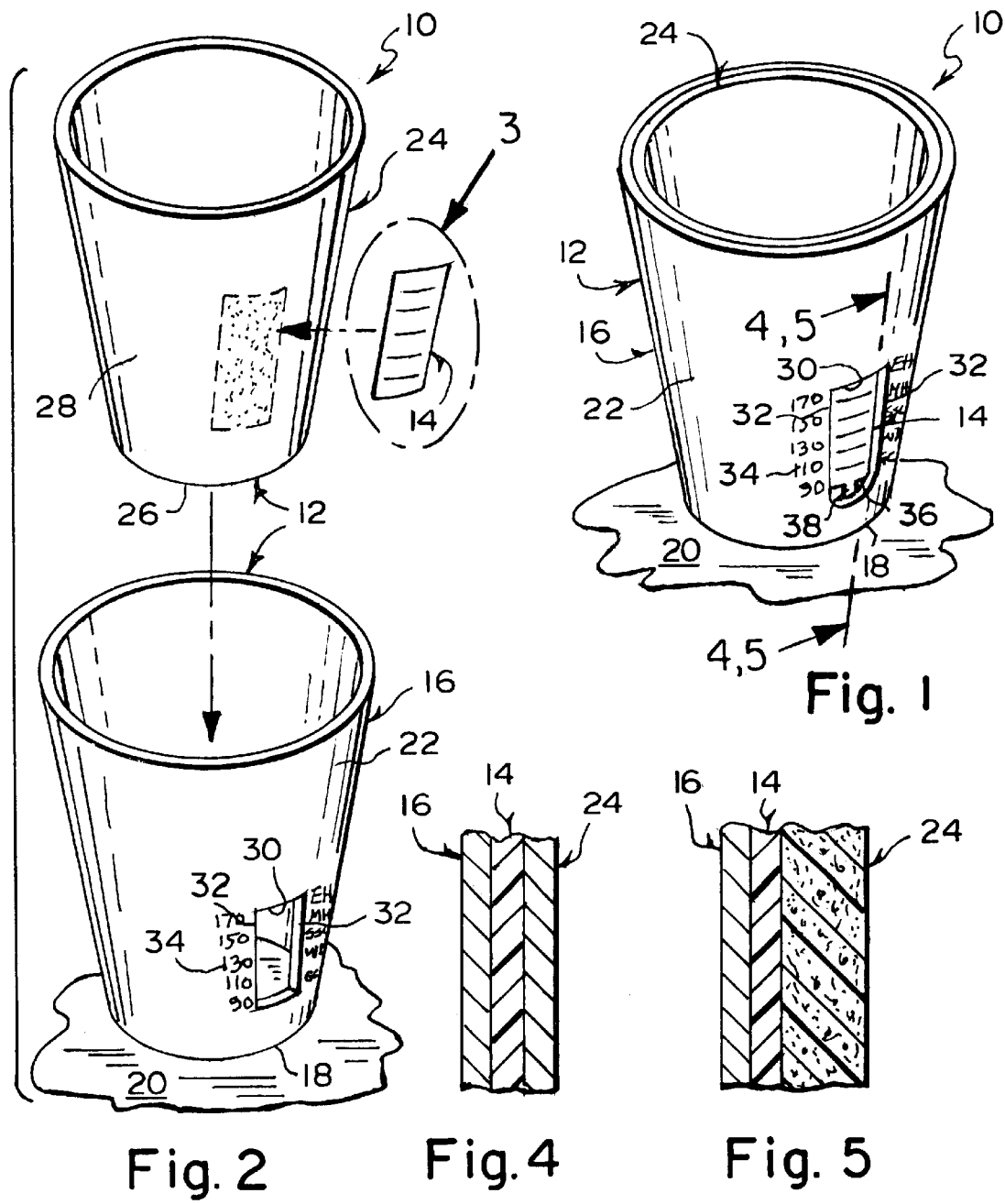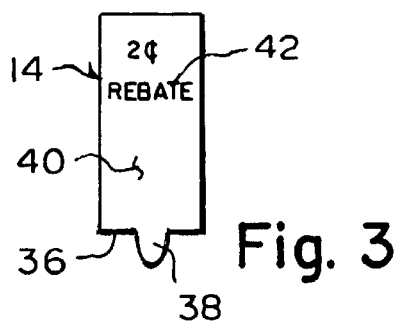

CUP FOR INDICATING TEMPERATURE OF CONTENTS THEREOF AND METHOD OF MAKING

BACKGROUND OF THE INVENTION

1. Field of the Invention

The present invention relates to a cup. More particularly, the present invention relates to a cup for indicating temperature of contents thereof and method of making.

2. Description of the Prior Art

Numerous innovations for temperature measuring containers have been provided in the prior art that will be described. Even though these innovations may be suitable for the specific individual purposes to which they address, however, they differ from the present invention.

A FIRST EXAMPLE, U.S. Pat. No. Des. 343,129 to Farley teaches the ornamental design for a temperature measuring cup.

A SECOND EXAMPLE, U.S. Pat. No. 3,826,221 to Ross teaches a closure cap for a container that has an aperture normally covered by a seal which is capable of being peeled off the cap to expose the aperture. At least part of the seal is arranged to change color when the cap is exposed to heat.

A THIRD EXAMPLE, U.S. Pat. No. 4,919,983 to Fremin teaches a container for feeding infants which has a body formed by blow molding constructed of a thermoplastic material permitting light transmission. The container is shaped like a baby bottle or cup and contains, in formulation, along with the thermoplastic material a thermochromic composition consisting of from 5 to 10 percent by weight. This combination permits the container to undergo a distinct change in color when the temperature within exceeds a given threshold providing a conspicuous indication of the liquid contents if above the human zone of comfort. Another embodiment incorporates the thermochromatic composition in the middle composite of a multi-layered polyethylene bag for use with baby feeding container having a rigid outer enclosure and a polyethylene liner bag.

A FOURTH EXAMPLE, U.S. Pat. No. 5,588,747 to Blevins teaches a measuring cup with a thermometer mounted on an exterior surface thereof for measuring the temperature of a liquid prior to placing it in the cup. The cup can be used in many operations involving a liquid which have a critical temperature requirement. One such operations is breadmaking in which water, once it has been warmed to a desired temperature, is added to yeast or, alternately, to a flour mixture containing yeast. To use the cup in breadmaking, the cup is placed under a stream of warm water and, when the thermometer indicates the water has reached the desired temperature, the water in a measured amount is added to the cup.

A FIFTH EXAMPLE, U.S. Pat. No. 5,720,555 to Elele teaches a temperature indicating container apparatus that includes an inner container portion made from substantially heat insulative material. A thermochromic-substance-containing portion is juxtaposed against an outside surface of the inner container portion, such that color changes of the thermochromic-substance-containing portion can be seen from outside the inner container portion. The thermochromic-substance-containing portion may be in a form of a jacket around the outside surface of the inner container portion. The jacket may include a plurality of windows. An outermost container portion may be located outside both the thermochromic-substance-containing jacket and the inner container portion. The outermost container portion is light transmissive such that color changes of the thermochromic-substance-containing jacket can be seen from outside the outermost container portion. A bridge element bridges top portions of the inner container portion and the outermost container portion. The bridge element, a top portion of the inner container portion, and a top portion of the outermost container portion form a unified, liquid-tight seal. A lid assembly includes a lid portion for covering the inner container portion and the thermochromic-substance-containing portion. The lid portion may include thermochromic substances. The lid assembly may also include an orientation-changeable signal assembly that is connected to a top surface of the lid portion.

It is apparent that numerous innovations for temperature measuring containers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a cup for indicating temperature of contents thereof and method of making that avoids the disadvantages of the prior art.

ANOTHER OBJECT of the present invention is to provide a cup for indicating temperature of contents thereof and method of making that is simple and inexpensive to manufacture.

STILL ANOTHER OBJECT of the present invention is to provide a cup for indicating temperature of contents thereof and method of making that is simple to use.

BRIEFLY STATED, YET ANOTHER OBJECT of the present invention is to provide a cup for indicating temperature of contents thereof and a method of making. The cup includes a body that is cup-shaped and a temperature sensitive strip that is disposed on the body and indicates the temperature of the contents thereof. The body includes an outer cup and an inner cup that is disposed in, and is in intimate contact with, the outer cup. The temperature sensitive strip has a shape and is removably adhered on the longitudinal wall of the inner cup, just above the base thereof. The outer cup has a bore that has a shape, a pair of vertical edges, and extends through the longitudinal wall thereof, just above the base thereof. The shape of the bore matches the shape of the temperature sensitive strip so as to allow the temperature sensitive strip to be viewed through the bore. The longitudinal wall of the outer cup further has a temperature scale thereon that is disposed adjacent both vertical edges of the bore and collaborates with the temperature sensitive strip to indicate the temperature of the contents of the cup.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention;

FIG. 2 is an exploded diagrammatic perspective view of the present invention shown in FIG. 1;

FIG. 3 is an enlarged diagrammatic front elevational view of the area generally enclosed by the dotted curve identified by arrow 3 in FIG. 2 of the temperature sensitive strip;

FIG. 4 is an enlarged diagrammatic cross sectional view taken on line 4—4 in FIG. 1 of a first embodiment of the present invention;

FIG. 5 is an enlarged diagrammatic cross sectional view taken on line 5—5 in FIG. 1 of a second embodiment of the present invention.

Figure 6A:
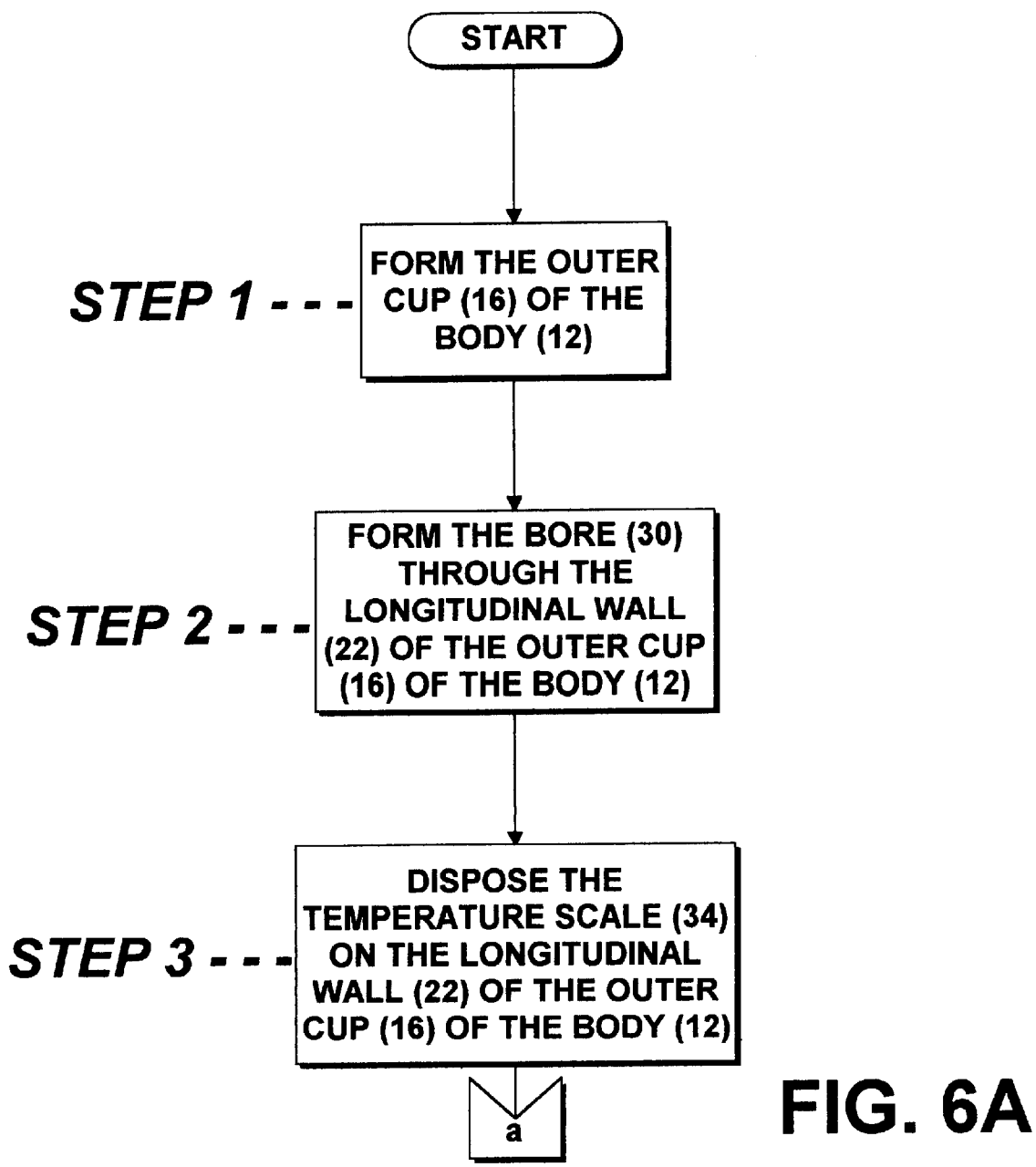
FIGS. 6A–6B are a process flow of the method of making the present invention.

LIST OF REFERENCE NUMERALS UTILIZED IN THE DRAWING 10 cup of present invention for indicating temperature of contents thereof
12 body
14 temperature sensitive strip for indicating temperature of contents thereof
16 outer cup of body 12
18 base of outer cup 16 of body 12 for resting on surface 20
20 surface
22 longitudinal wall of outer cup 16 of body 12
24 inner cup of body 12
26 base of inner cup 24 of body 12
28 longitudinal wall of inner cup 24 of body 12
30 bore in outer cup 16 of body 12
32 pair of vertical edges of bore 30 in outer cup 16 of body 12 temperature scale on longitudinal wall 22 of outer cup 16 of body 12 for indicating temperature of contents of cup 10
36 bottom edge of temperature sensitive strip
38 tab on bottom edge 36 of temperature sensitive strip for facilitating removal thereof from longitudinal wall 28 of inner cup 24 of body 12 so as to allow temperature sensitive strip 14 to be removed and mailed in for rebate so as to encourage recycling of temperature sensitive strip 14
40 back face of temperature sensitive strip 14
42 indicia "2 CENT REBATE" on back face 40 of temperature sensitive strip 14

DETAILED DESCRIPTION OF THE PREFERRED EMBODIMENT

Referring now to the figures, in which like numerals indicate like parts, and particularly to FIG. 1, the cup of the present invention is shown generally at 10 for indicating temperature of contents thereof.

The overall configuration of the cup 10 can best be seen in FIGS. 1–5, and as such, will be discussed with reference thereto.

The cup 10 comprises a body 12 that is cup-shaped, and a temperature sensitive strip 14 that is disposed on the body 12 for indicating the temperature of the contents thereof and is made of a temperature sensitive plastic material.

The body 12 comprises an outer cup 16 that has a base 18 for resting on a surface 20, and a longitudinal wall 22 that extends upwardly from the base 18 of the outer cup 16 of the body 12.

The body 12 further comprises an inner cup 24 that is disposed in, and is in intimate contact with, the outer cup 16 of the body 12, and has a base 26 that abuts against the base 18 of the outer cup 16 of the body 12, and a longitudinal wall 28 that extends upwardly from the base 26 of the inner cup 24 of the body 12 and abuts against the longitudinal 22 wall of the outer cup 16 of the body 12.

The inner cup 24 of the body 12 is made of either paper or thin plastic, while the outer cup 16 of the body 12 is made of either paper, thin plastic, or styrofoam.

The temperature sensitive strip 14 is disposed on the inner cup 24 of the body 12, has a shape, and is removably adhered on, and is in temperature communication with, the longitudinal wall 28 of the inner cup 24 of the body 12, just above the base 26 thereof.

The outer cup 16 of the body 12 has a bore 30 that has a shape, a pair of vertical edges 32, and extends through the longitudinal wall 22 thereof, just above the base 18 thereof.

The shape of the bore 30 in the longitudinal wall 22 of the outer cup 16 of the body 12 matches the shape of the temperature sensitive strip 14 so as to allow the temperature sensitive strip 14 to be viewed through the bore 30 in the longitudinal wall 22 of the outer cup 16 of the body 12.

The longitudinal wall 22 of the outer cup 16 of the body 12 further has a temperature scale 34 thereon that is disposed adjacent both vertical edges 32 of the bore 30 in the longitudinal wall 22 of the outer cup 16 of the body 12 and collaborates with the temperature sensitive strip 14 for indicating the temperature of the contents of the cup 10.

The temperature sensitive strip 14 has a bottom edge 36 with a tab 38 thereon for facilitating removal thereof from the longitudinal wall 28 of the inner cup 24 of the body 12 so as to allow the temperature sensitive strip 14 to be removed and mailed in for a rebate so as to encourage recycling of the temperature sensitive strip 14.

The temperature sensitive strip 14 has a back face 40 that is adhered to the longitudinal wall 28 of the inner cup 24 of the body 12 and contains indicia "2 CENT REBATE" 42.

Figure 6B:
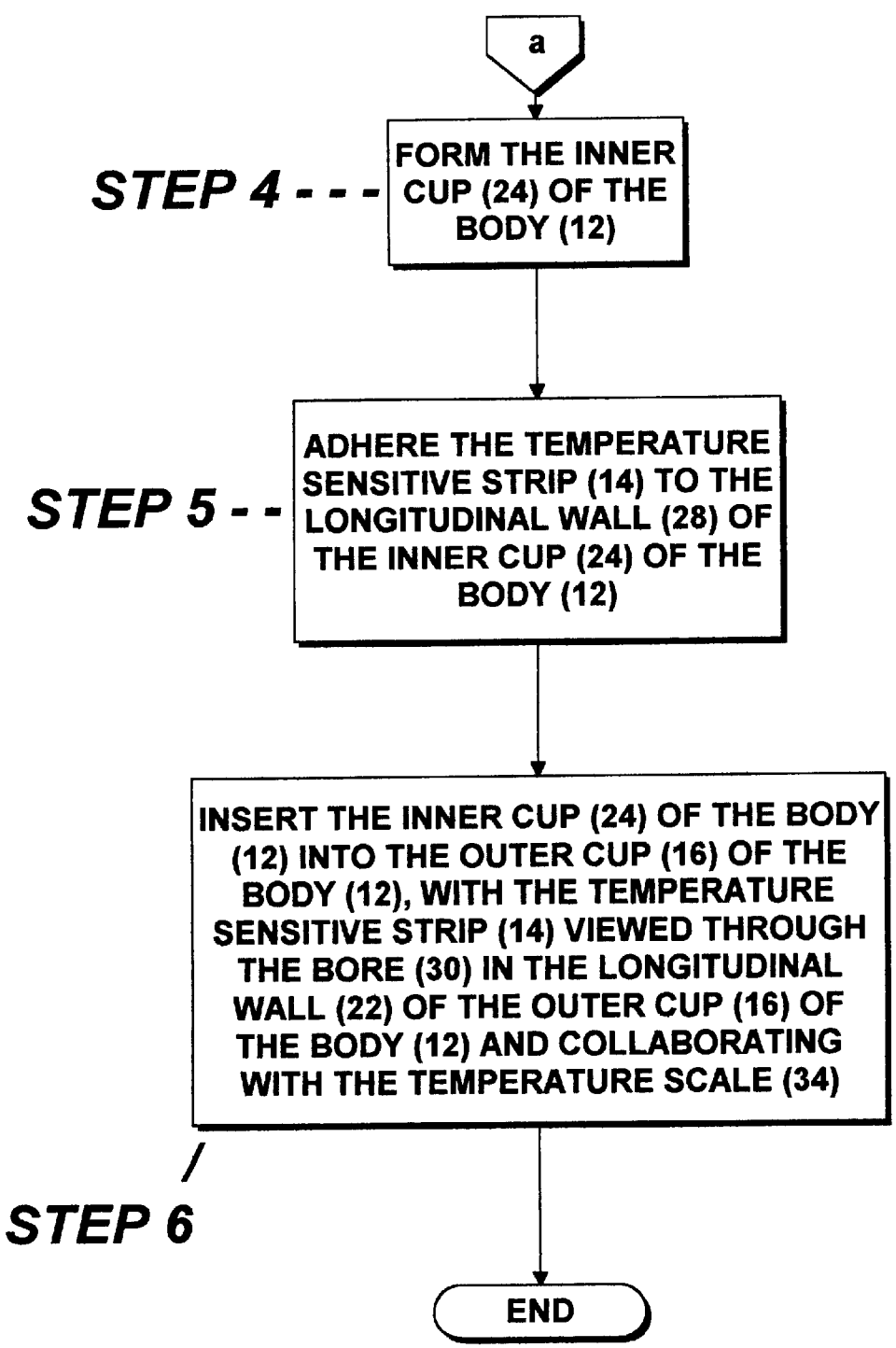

The method of making the cup 10 can best be seen in FIGS. 6A–6B, and as such, will be discussed with reference thereto.

STEP 1: Form the outer cup 16 of the body 12.
STEP 2: Form the bore 30 through the longitudinal wall 22 of the outer cup 16 of the body 12.
STEP 3: Dispose the temperature scale 34 on the longitudinal wall 22 of the outer cup 16 of the body 12.
STEP 4: Form the inner cup 24 of the body 12.
STEP 5: Adhere the temperature sensitive strip 14 to the longitudinal wall 28 of the inner cup 24 of the body 12.
STEP 6: Insert the inner cup 24 of the body 12 into the outer cup 16 of the body 12, with the temperature sensitive strip 14 viewed through the bore 30 in the longitudinal wall 22 of the outer cup 16 of the body 12 and collaborating with the temperature scale 34.

It will be understood that each of the elements described above, or two or more together, may also find a useful application in other types of constructions differing from the types described above.

While the invention has been illustrated and described as embodied in a cup for indicating temperature of contents thereof and method of making, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A method of making a cup for indicating temperature of contents thereof, said method comprising the steps of:
   a) forming an outer cup of a body of said cup;
   b) forming a bore through a longitudinal wall of said outer cup of said body;
   c) disposing a temperature scale on said longitudinal wall of said outer cup of said body;
   d) forming an inner cup of said body;
   e) adhering a temperature sensitive strip to a longitudinal wall of said inner cup of said body; and
   f) inserting said inner cup of said body into said outer cup of said body, with said temperature sensitive strip viewed through said bore in said longitudinal wall of said outer cup of said body and collaborating with said temperature scale.

2. The method as defined in claim 1, wherein said step of adhering a temperature sensitive strip to a longitudinal wall of said inner cup of said body includes adhering a temperature sensitive strip that is made of a temperature sensitive plastic material to a longitudinal wall of said inner cup of said body.

3. The method as defined in claim 1, wherein said step of forming an outer cup of a body includes forming an outer cup of a said body that has a base for resting on a surface, and a longitudinal wall that extends upwardly from said base of said outer cup of said body.

4. The method as defined in claim 3, wherein said step of forming an inner cup of said body includes forming an inner cup of said body having a base and a longitudinal wall that extends upwardly from said base of said inner cup, and wherein on said step of inserting said inner cup of said body into said outer cup of said body, said inner cup of said body is disposed in, and is in intimate contact with, said outer cup of said body such that said base of said inner cup of said body abuts against said base of said outer cup of said body and said longitudinal wall of said inner cup of said body abuts against said longitudinal wall of said outer cup of said body.

5. The method as defined in claim 1, wherein said step of forming an inner cup of said body includes forming an inner cup of said body that is made of paper.

6. The method as defined in claim 1, wherein said step of forming an outer cup of said body includes forming an outer cup of said body that is made of paper.

7. The method as defined in claim 1, wherein said step of forming an inner cup of said body includes forming an inner cup of said body that is made of thin plastic.

8. The method as defined in claim 1, wherein said step of forming an outer cup of said body includes forming an outer cup of said body that is made of thin plastic.

9. The method as defined in claim 1, wherein said step of forming an outer cup of said body includes forming an outer cup of said body that is made of styrofoam.

10. The method as defined in claim 4, wherein said step of adhering a temperature sensitive strip to a longitudinal wall of said inner cup of said body includes adhering removably a temperature sensitive strip that has a shape on said longitudinal wall of said inner cup of said body, just above said base thereof.

11. The method as defined in claim 1, wherein said step of forming a bore through a longitudinal wall of said outer cup of said body includes forming a bore that has a shape and a pair of vertical edges through said longitudinal wall thereof, just above said base thereof.

12. The method as defined in claim 10, wherein said step of forming a bore through a longitudinal wall of said outer cup of said body includes forming a bore that has a shape that matches said shape of said temperature sensitive strip so as to allow said temperature sensitive strip to be viewed through said bore in said longitudinal wall of said outer cup of said body.

13. The method as defined in claim 11, wherein said step of disposing a temperature scale on said longitudinal wall of said outer cup of said body includes disposing a temperature scale on said longitudinal wall of said outer cup of said body adjacent both vertical edges of said bore in said longitudinal wall of said outer cup of said body and collaborating with said temperature sensitive strip for indicating the temperature of the contents of said cup.

14. The method as defined in claim 1, wherein said step of adhering a temperature sensitive strip to a longitudinal wall of said inner cup of said body includes adhering a temperature sensitive strip having a bottom edge with a tab thereon for facilitating removal thereof from said longitudinal wall of said inner cup of said body so as to allow said temperature sensitive strip to be removed and mailed in for a rebate so as to encourage recycling of said temperature sensitive strip to a longitudinal wall of said inner cup of said body.

15. The method as defined in claim 1, wherein said step of adhering a temperature sensitive strip to a longitudinal wall of said inner cup of said body includes adhering a temperature sensitive strip having a back face adhered to said longitudinal wall of said inner cup of said body and containing indicia "2 CENT REBATE".

* * * * *